United States Patent
Kobayashi et al.

(10) Patent No.: US 8,545,356 B2
(45) Date of Patent: Oct. 1, 2013

(54) SPEED CHANGE GEAR DEVICE

(75) Inventors: Tsune Kobayashi, Aichi (JP); Tohru Onozaki, Nagoya (JP); Hideki Shibata, Kariya (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/810,806

(22) PCT Filed: Jul. 22, 2011

(86) PCT No.: PCT/JP2011/066709
§ 371 (c)(1),
(2), (4) Date: Mar. 28, 2013

(87) PCT Pub. No.: WO2012/011573
PCT Pub. Date: Jan. 26, 2012

(65) Prior Publication Data
US 2013/0203544 A1    Aug. 8, 2013

(30) Foreign Application Priority Data
Jul. 23, 2010    (JP) .................................. 2010-165571

(51) Int. Cl.
*F16H 1/32*    (2006.01)
(52) U.S. Cl.
USPC .......................................... 475/162; 475/178
(58) Field of Classification Search
USPC ............................................... 475/162, 178
See application file for complete search history.

(56) References Cited

U.S. PATENT DOCUMENTS
2008/0150241 A1    6/2008    Azekatsu et al.

FOREIGN PATENT DOCUMENTS

| JP | 43 24175 | 10/1968 |
|----|----------|---------|
| JP | 50 158766 | 12/1975 |
| JP | 52 139860 | 11/1977 |
| JP | 2000 81097 | 3/2000 |
| JP | 2002 266955 | 9/2002 |
| JP | 2008 157351 | 7/2008 |
| JP | 2009 47214 | 3/2009 |

OTHER PUBLICATIONS

International Search Report Issued Oct. 11, 2011 in PCT/JP11/66709 Filed Jul. 22, 2011.

*Primary Examiner* — Erin D Bishop
(74) *Attorney, Agent, or Firm* — Oblon, Spivak, McClelland, Maier & Neustadt, L.L.P.

(57) ABSTRACT

A speed change gear device is provided with a housing, a first member supported rotatably about a predetermined rotational axis, a shaft member formed with an external gear, an annular member formed with an internal gear meshing with the external gear, and a transmission mechanism for transmitting a rotational component only of the annular member to the shaft member or a disc member arranged to be rotatable relative to the housing. The external gear differs from the internal gear in the number of teeth. Further, the first member is formed with a receiving hole that receives the annular member at a position where the center of the annular member is at a predetermined distance from the rotational axis. Then, the annular member is received in the receiving hole rotatably relative to the first member.

8 Claims, 12 Drawing Sheets

SPEED CHANGE GEAR DEVICE

TECHNICAL FIELD

The present invention relates to a speed change gear device.

BACKGROUND ART

Speed change gear devices are used as reduction gears or speed increasing gears that change the speed of rotation inputted by a driving source such as motor or the like. As the speed change gear devices like this, for example, Patent Documents 1 and 2 disclose reduction gears utilizing a planetary gear mechanism. In these reduction gears, planetary gears are revolved around a predetermined rotational axis, and only the rotational components of the planetary gears that components correspond to the difference in the number of teeth between external gears of the planetary gear and an internal gear meshing with the external gears are outputted through a transmission mechanism. With the construction like this, the reduction gears in Patent Documents 1 and 2 are deemed to be able to obtain a high speed change ratio through a single stage.

PRIOR ART DOCUMENT

Patent Document

Patent Document 1: JP 2002-266955 A
Patent Document 2: JP 2009-047214 A

SUMMARY OF THE INVENTION

Problem to be Solved by the Invention

Like the reduction gears in Patent Documents 1 and 2, the speed change gear device in the prior art supports the planetary gears through bearings at eccentric portions formed on an input shaft member to make the planetary gears perform revolution motions. In transmitting a driving force, as exerted on the bearings, a comparatively large load is exerted between the input shaft member rotating about the predetermined rotational axis and the planetary gears performing the revolution motions. For this reason, in order to secure a sufficient strength on the bearings interposed between both members, it is conceivable for example that a load per unit area is reduced by enlarging the outer diameter of the bearings. However, if the components such as the bearings or the like of the speed change gear device were increased in diameter, it would become necessary to increase other members in dimension at the same time, and this would give rise to an anxiety that the speed change gear device is enlarged in dimension and increased in weight as a whole.

The present invention has been made taking these circumstances into consideration, and an object thereof is to provide a speed change gear device which is provided with a construction differing from that in the prior art and which is capable of obtaining a high speed change ratio and of improving the strength of the device as a whole.

Measures to Solve the Problem (1) A speed change gear device according to a first invention comprises a housing; a cylindrical first member supported in the housing rotatably about a predetermined rotational axis; a shaft member arranged inside the first member rotatably about the rotational axis and formed with an external gear on a peripheral surface thereof; an annular member arranged inside the first member with the shaft member passing therethrough and formed with an internal gear meshing with the external gear, at an internal surface thereof; a second member arranged not to be rotatable relative to the housing; and a transmission mechanism that transmits a rotational component only of the annular member to the second member; wherein the external gear differs from the internal gear in the number of teeth; wherein the first member is formed with a receiving hole receiving the annular member at a position where a center of the annular member is at a predetermined distance from the rotational axis; and wherein the annular member is received in the receiving hole to be rotatable relative to the first member.

In the speed change gear device according to the first invention constructed like this, when the first member is rotated by having a driving force inputted thereto, the annular member received in the receiving hole of the first member revolves around the rotational axis with the rotation of the first member. Further, the revolving annular member transmits the rotational component only to the second member through the transmission mechanism. Here, the second member to which the rotational component of the annular member is transmitted is arranged not to be rotatable relative to the housing, and thus, the annular member is restrained from rotating while revolving. Then, the shaft member formed with the external gear meshing with the internal gear of the annular member is rotated about the rotational axis at a rotational speed depending on the difference in the number of teeth between the both gears and outputs a driving force. Like this, the speed change gear device is able to obtain a high speed change ratio by changing in speed and outputting the revolution component of the annular member that revolves with its rotation restrained.

Further, the speed change gear device takes the construction that supports the annular member at the position where the center of the annular member is at the predetermined distance from the rotational axis, so that the annular member performs the revolution motion with the rotation of the first member. Then, in the present invention, unlike the construction that an input shaft member has an eccentric shaft portion as is the case of the prior art, the annular member is eccentrically supported in the receiving hole formed in the first member that is arranged outside the shaft member and the annular member. With this construction, because it is possible to locate at an outer side of the device the region where the first member supports the annular member, it is possible to sufficiently secure the strength of the region on which a comparatively large load is exerted at the time of the transmission of a driving force. Accordingly, even in the construction that a bearing is interposed between the first member and the annular member, it is possible to reduce the load per unit area on the bearing.

(2) A speed change gear device according to a second invention comprises a housing; a cylindrical first member supported in the housing rotatably about a predetermined rotational axis; a shaft member arranged on the rotational axis not to rotatable relative to the housing and formed with an external gear on a peripheral surface thereof; an annular member arranged inside the first member with the shaft member passing therethrough and formed with an internal gear meshing with the external gear, at an internal surface thereof; a second member arranged in the housing rotatably about the rotational axis; and a transmission mechanism that transmits a rotational component only of the annular member to the second member; wherein the external gear differs from the internal gear in the number of teeth; wherein the first member is formed with a receiving hole receiving the annular member at a position where a center of the annular member is at a predetermined distance from the rotational axis; and wherein the annular member is received in the receiving hole rotatably relative to the first member.

The speed change gear device according to the second invention differs in that the change in speed is made between the first member and the second member though the speed change gear device according to the first invention changes the speed between the first member and the shaft member. Then, in the speed change gear device of the present invention constructed as described above, when the first member is rotated by having a driving force inputted thereto, the annular member revolves with this rotation. Here, because the shaft member formed with the external gear meshing with the internal gear of the annular member is arranged not to be rotatable relative to the housing, the annular member rotates at a rotational speed depending on the difference in the number of teeth between the both gears. Then, the annular member revolving while rotating transmits the rotational component only to the second member through the transmission mechanism. In this way, because the speed change device is able to output from the second member the rotational component only of the annular member that revolves while rotating, it is possible to obtain a high speed change ratio and to perform the same effects as the speed change gear device according to the first invention does.

(3) Further, the second member may be juxtaposed with the annular member in an axial direction of the rotational axis; and the transmission mechanism may comprise a pin formed on one of the annular member and the second member and an insertion hole formed on the other of the annular member and the second member and having the pin inserted thereinto; wherein the shape of the insertion hole may be the same as a circumscribed circle of the locus of the pin when the annular member revolves around the rotational axis.

With the construction like this, the transmission mechanism couples the annular member and the second member through the engagement of the pin with the insertion hole. Then, the shape of the insertion hole is formed to become the same as the circumscribed circle of the locus of the pin relative to the member formed with the insertion hole when the annular member revolves around the rotational axis. Thus, when the annular member revolves around the rotational axis, the revolution component of the annular member is allowed, and the rotational component of the annular member operates together with the second member. That is, the annular member is restrained from rotating where the second member is not rotatable relative to the housing, and the rotation of the annular member and the rotation of the second member are synchronized where the second member is rotatable relative to the housing. Accordingly, the speed change gear device is able to reliably transmit the rotational component only of the annular member to the second member through the transmission mechanism.

(4) Further, a plurality of the annular members may be provided; and the first member may be formed with a plurality of the receiving holes so that the plurality of annular members are arranged with centers thereof being different.

With the construction like this, it is possible to disperse the load at the time of the transmission of a driving force between the annular members with the internal gears and the shaft member formed with the external gear meshing with the internal gears. Accordingly, the speed change gear device can be enhanced in the maximum driving force that is transmittable mechanically.

(5) Further, the plurality of receiving holes may be formed so that the centers of the plurality of received annular members are at equiangular intervals in a rotational direction about the rotational axis.

With the construction like this, the respective annular members supported in the internal surfaces of the plurality of receiving holes are arranged at equiangular intervals in the circumferential direction about the rotational axis. That is, the receiving holes are formed in the first member so that the respective annular members are arranged at 180-degree intervals where the speed change gear device is provided with two annular members, and at 120-degree intervals where it is provided with three annular members. Thus, with the rotation of the first member, it is possible to mutually offset the imbalances that are brought about by the revolution motions of the annular members arranged eccentrically from the rotational axis. Accordingly, it is possible to suppress the vibration of the speed change gear device as a whole and to stably operate the speed change gear device.

BRIEF DESCRIPTION OF THE DRAWINGS

FIG. 3 is a view in the A direction in FIG. 2 wherein a part is seen through.

FIG. 7 is a view in the B direction in FIG. 6 wherein a part is seen through.

FORMS FOR PRACTICING THE INVENTION

Figure 1:
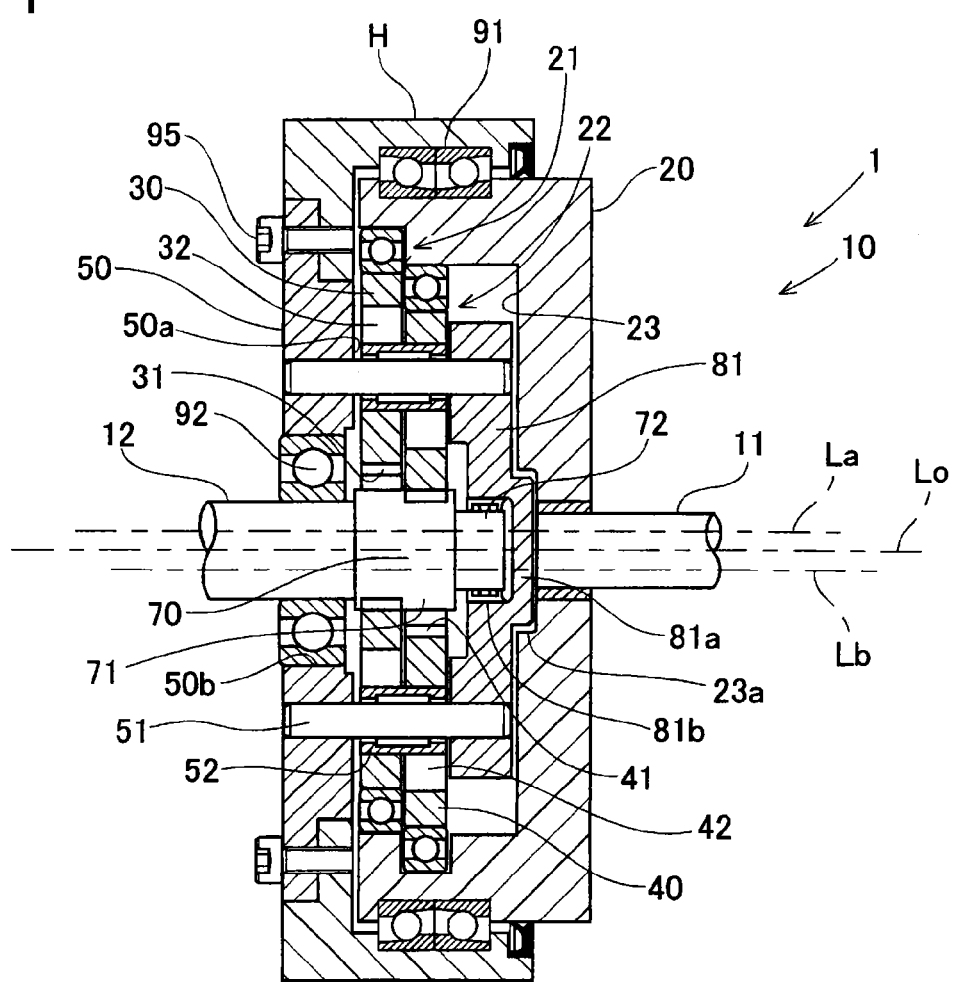
FIG. 1 is a sectional view showing the construction of a reduction gear 1 in a first embodiment.

Hereinafter, with reference to the drawings, description will be made regarding embodiments to which a speed change gear device of the present invention is embodied.

First Embodiment

In the present embodiment, a reduction gear 1 to which the speed change gear device of the present invention is applied will be described with reference to FIGS. 1-3. In FIG. 3, only parts of respective gears are shown to illustrate a state of meshings between internal gears 31, 41 and an external gear 71. Thus, there is a difference in the number of teeth exemplified in the present embodiment. Further, the reduction gear 1 in the present embodiment corresponds to a speed change gear device according to the first invention wherein a second member (disc member 50) is arranged not to be rotatable relative to a housing H to restrict the rotation of annular members (first and second annular members 30, 40) and wherein revolution components of the annular members are changed in speed to be outputted.

(Construction of the Reduction gear 1)

The reduction gear 1 is mainly composed of the housing H, a gear mechanism 10, an input shaft member 11, and an output shaft member 12. The gear mechanism 10 is composed of an outer ring 20 (corresponding to "first member" in the present invention), the first annular member 30, the second annular member 40, the disc member 50 (corresponding to "second member" in the present invention), a gear shaft 70 (corresponding to "shaft member" in the present invention), a pin supporting member 81, and bearings 91, 92. As shown in FIG. 1, the housing H is a case that directly or indirectly and rotatably supports the input shaft member 11 and the output shaft member 12 which are arranged coaxially on a predetermined rotational axis Lo and that receives the gear mechanism 10 which performs a speed change.

The input shaft member 11 is an input shaft that is coupled to a rotor of a motor (not shown) being a driving source and that is rotated by driving the motor to input a driving force to the gear mechanism 10. The input shaft member 11 is arranged on one side (right side in FIGS. 1 and 2) of the reduction gear 1 and is coupled to the outer ring 20 of the gear mechanism 10 at its end on the other side. Further, the input shaft member 11 is supported through the outer ring 20 to be rotatable about the rotational axis Lo relative to the housing H.

The output shaft member 12 is an output shaft that outputs the rotation reduced in speed by the gear mechanism 10. The output shaft member 12 is arranged on the other side of the reduction gear 1 (left side in FIGS. 1 and 2) and is coupled to the gear shaft 70 of the gear mechanism 10 at its end on one side. Further, the output shaft member 12 is supported through the bearing 92, provided in an internal surface 50b of the disc member 50 of the gear mechanism 10, to be rotatable about the rotational axis Lo relative to the housing H.

The outer ring 20 is an input member that is formed to a bottomed cylindrical shape and that is coupled to the input shaft member 11 press-fitted in a cylindrical internal surface formed at the center portion thereof, to input a driving force. The outer ring 20 is supported in the housing H through the bearings 91, arranged on the outer peripheral side, to be rotatable about the rotational axis Lo. Further, the outer ring 20 is formed with a first receiving hole 21 and a second receiving hole 22 at the internal surfaces thereof. The first receiving hole 21 is defined by a cylindrical internal surface centered on a first eccentric axis La which is eccentric by a predetermined distance from the rotational axis Lo. Similarity, the second receiving hole 22 is defined by a cylindrical internal surface which is eccentric by the predetermined distance from the rotational axis Lo and which is centered on a second eccentric axis Lb differing from the first eccentric axis La.

The first receiving hole 21 and the second receiving hole 22 are formed to direct the eccentric directions from the rotational axis Lo in mutually opposite directions. That is, the first receiving hole 21 and the second receiving hole 22 are formed at 180-degree intervals to have equiangular distances in the rotational direction about the rotational axis Lo. Further, although in the present embodiment, the first and second receiving holes 21, 22 are formed directly on the internal surfaces of the outer ring 20, they may be configured by separate members that are respectively fixedly inserted into internal surfaces of the outer ring 20. Further, the outer ring 20 is formed with a recessed portion 23a at a bottom portion 23. The recessed portion 23a is formed to a recess shape heading from the end surface on the other side of the reduction gear 1 toward one side (from left side to right side in FIG. 1) and constitutes a cylindrical internal surface centered on the rotational axis Lo.

The first annular member 30 is a planetary gear formed annularly and arranged inside the outer ring 20 with the gear shaft 70 passing therethrough. The first annular member 30 is received in the first receiving hole 21 of the outer ring 20 through a bearing and is supported rotatably relative to the outer ring 20. That is, the first receiving hole 21 receives the first annular member 30 at a position where the center of the first annular member 30 is at a predetermined distance from the rotational axis Lo. With this construction, the distance of the first eccentric axis La of the first annular member 30 to the rotational axis Lo is maintained fixed, whereby the first annular member 30 performs a revolution motion with the rotation of the outer ring 20.

Figure 2:
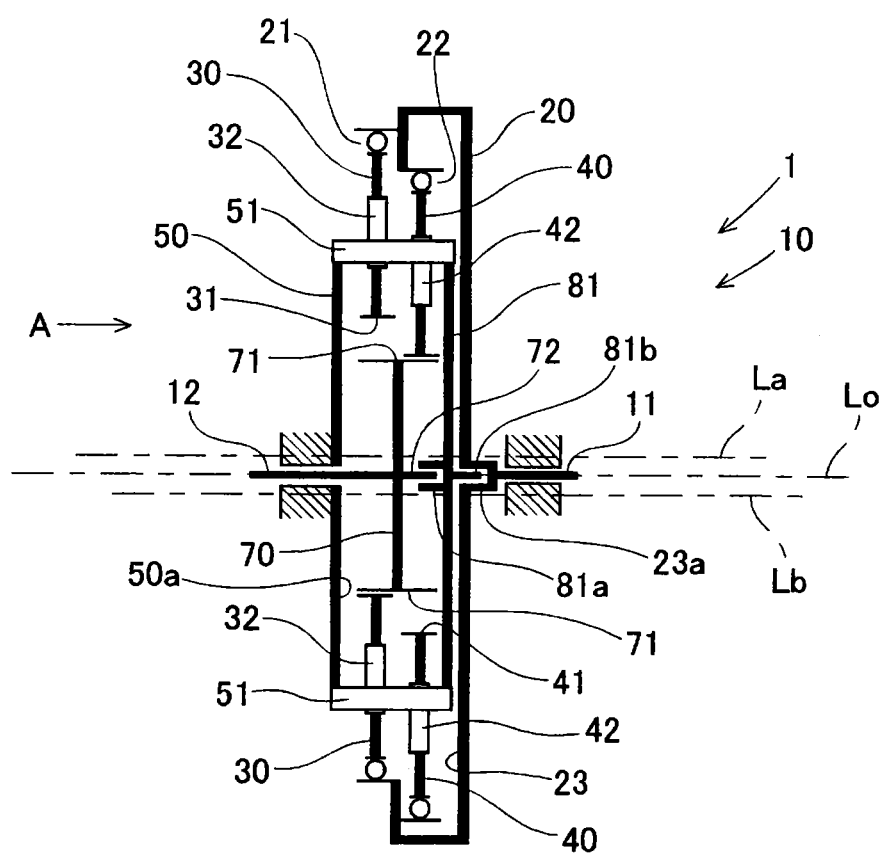
FIG. 2 is a conceptual diagram showing the basic construction of the reduction gear 1.
Figure 3:
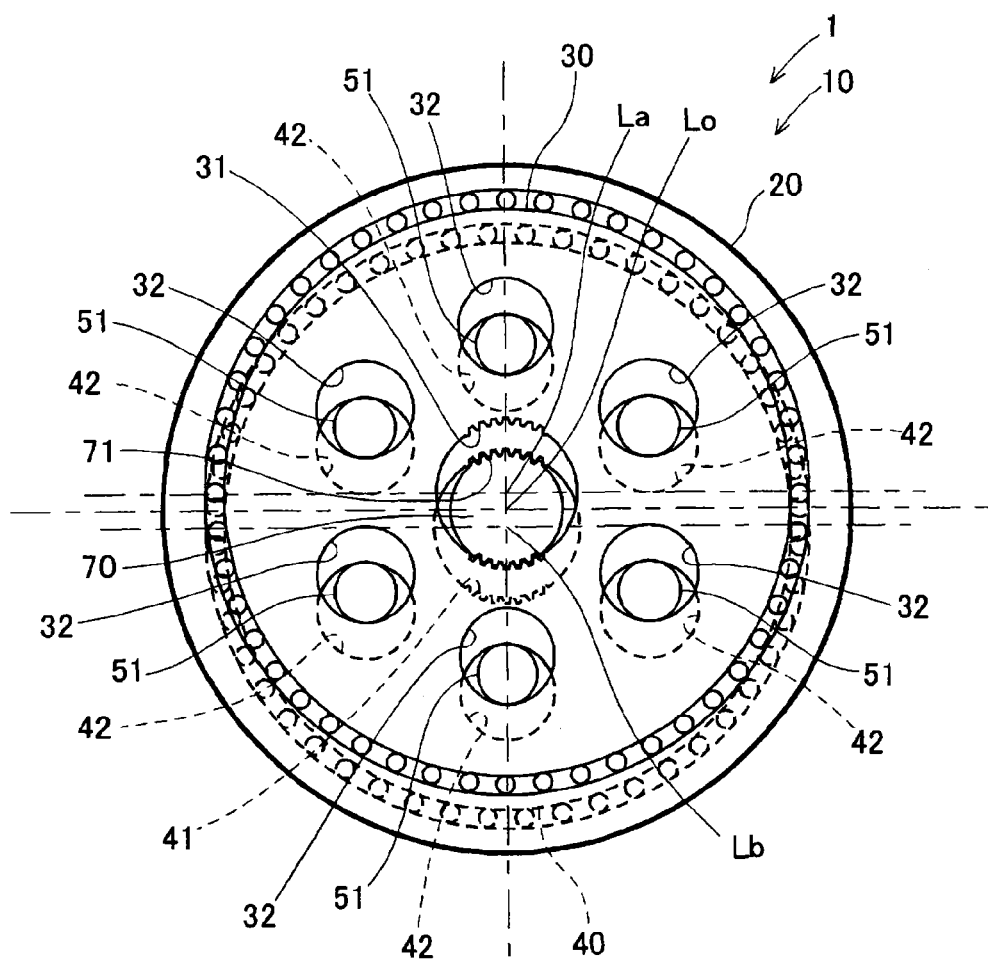

Further, as shown in FIGS. 1 and 2, the first annular member 30 is formed with an internal gear 31 formed on the internal surface thereof and insertion holes 32 that are formed to pass in the direction of the rotational axis Lo across opposite end surfaces of the first annular members 30. The insertion holes 32 are pin holes into which pins 51 formed on the disc member 50 are inserted. In the present embodiment, as shown in FIG. 3, the insertion holes 32 formed at six places are arranged at equiangular intervals in the circumferential direction. The shape of the insertion holes 32 is formed to become the same as a circumscribed circle that the locus of the pin 51 draws relative to the first annular member 30 when the first annular member revolves around the rotational axis Lo. More specifically, the inside diameter of the insertion holes 32 is set to become almost equal to the sum of the diameter of the pin 51 including a rolling bearing 52 thereon and the eccentric amount of the first annular member 30 (the spaced distance between the rotational axis Lo and the first eccentric axis La).

The detail description of the second annular member 40 will be omitted because the same is a planetary gear being the same in shape as the aforementioned first annular member 30. Further, the internal gear 41, insertion holes 42 and the second eccentric axis Lb of the second annular member 40 correspond to the internal gear 31, the insertion holes 32 and the first eccentric axis La of the first annular member 30, respectively. Then, the second annular member 40 is received in the second receiving hole 22 of the outer ring 20. That is, the second receiving hole 22 receives the second annular member 40 at a position where the center of the second annular member 40 is at the predetermined distance from the rotational axis Lo. Here, the first receiving hole 21 and the second through hole 22 are formed at equiangular intervals in the rotational direction about the rotational axis Lo. Accordingly, when the outer ring 20 is rotated, the first annular member 30 and the second annular member 40 received in these holes revolve around the rotational axis Lo with the respective rotational axes (the first eccentric axis La and the second eccentric axis Lb) always maintaining the symmetrical positions relative to the rotational axis Lo.

As shown in FIG. 1, the disc member 50 is juxtaposed with the first annular member 30 and the second annular member 40 in the axial direction of the rotational axis Lo. Further, the disc member 50 is fixed to the housing H by means of bolts 95 and is arranged not to be rotatable relative to the housing H. The disc member 50 has the pins 51 that protrude from an end surface 50a on one side (right side in FIG. 1) toward the first annular member 30 and the second annular member 40 in the axial direction of the rotational axis Lo, and the rolling bearings 52. In the present embodiment, as shown in FIG. 3, six pins 51 are fixed on the end surface 50a at equiangular intervals in the circumferential direction of the disc member 50. Further, the disc member 50 is formed with the internal surface 50b taking a cylindrical shape and rotatably supports the output shaft member 12 through the bearing 92 provided inside the internal surface 50b.

Further, the disc member 50 has the cylindrical rolling bearings 52 that are rotatably fit on the outside of the pins 51 taking a columnar shape. The pins 51 are inserted into the insertion holes 32 of the first annular member 30 and the insertion holes 42 of the second annular member 40. Then, each rolling bearing 52 stands between the insertion hole 32, 42 and the pin 51, and parts of the outer peripheral surface of the bearing 52 are in contact with the internal surfaces of the respective insertion holes 32, 42. Like this, the pins 51 are engaged with the respective insertion holes 32, 42 through the rolling bearings 52.

When the first and second annular members 30, 40 perform revolution motions with the rotation of the outer ring 20, the disc member 50 of the construction like this receives a load from the internal surfaces of the respective insertion holes 32, 42 of the first and second annular members 30, 40 through the pins 51 and the rolling bearings 52. At this time, on the basis of the dimensional relation of the outer diameter of the pins 51 including the rolling bearings 52 to the respective insertion holes 32, 42, a load that is exerted by the rotational components only in the revolution motions of the first and second annular members 30, 40 is transmitted to the disc member 50. Here, in the present embodiment, because the disc member 50 is fixed to the housing H, the first and second annular members 30, 40 are restrained from rotating. Like this, the pins 51 and the insertion holes 32, 42 constitute a transmission mechanism that transmits to the disc member 50 the rotational components only of the first and second annular members 30, 40 performing revolution motions.

The gear shaft 70 is a sun gear formed to a shaft shape and having an external gear 71 and a protrusion 72, as shown in FIGS. 1 and 2, and is arranged in the interior of the outer ring 20 to be rotatable about the rotational axis Lo. Further, the gear shaft 70 is an output member which has the output shaft member 12 coupled at the end portion and which outputs a driving force. The external gear 71 is formed on the peripheral surface of the gear shaft 70, passes through the internal surface sides of the first and second annular members 30, 40 and is in mesh with the internal gears 31, 41. Further, the number of the teeth on the external gear 71 of the gear shaft 70 is set to be less than the number of teeth on the internal gears 31, 41, and the first and second annular members 30, 40 are arranged eccentrically with respect to the rotational axis Lo, so that the external gear 71 is meshing with the internal gears 31, 41 at parts thereof only. The protrusion 72 is formed to protrude from an end surface on one side (right side in FIG. 1) of the gear shaft 70 toward the input shaft member 11 in the axial direction of the rotational axis Lo, and is formed to a cylindrical shape being smaller in diameter than the portion on which the external gear 71 is formed, with its center on the rotational axis Lo.

The pin supporting member 81 is a disc-like member which is arranged rotatably about the rotational axis Lo relative to the outer ring 20 between the outer ring 20 and the gear shaft 70. The pin supporting member 81 is juxtaposed with the first and second annular member 30, 40 in the axial direction of the rotational axis Lo. The pin supporting member 81 is formed with a protrusion 81a protruding from an end surface on one side (right in FIG. 1) toward the input shaft member 11 in the axial direction of the rotational axis Lo. Further, the pin supporting member 81 is formed with a recessed portion 81b being a cylindrical internal surface that extends from an end surface on the other side (left side in FIG. 1) of the pin supporting member 81 in the axial direction of the rotational axis Lo.

Then, the pin supporting member 81 is inserted at the protrusion 81a into the recessed portion 23a formed at the bottom portion 23 of the outer ring 20 and has the protrusion 72 of the gear shaft 70 inserted into the recessed portion 81b. Further, the pin supporting member 81 is formed with pin holes of the same number as the plurality of pins 51 and is coupled by press-fitting or clearance fitting to end portions of the pins 51 that pass through the insertion holes 32, 42 of the first and second annular members 30, 40. With this construction, the pin supporting member 81 supports the six pins 51 fixed on the disc member 50 and, because of being united with the housing H, the disc member 50 and the pins 51, rotates relative to the outer ring 20 at the same rotational speed as the disc member 50 with the rotation of the outer ring 20.

(Operation of the Reduction Gear 1)

Next, the operation of the reduction gear 1 in the present embodiment will be described. At first, when the motor (not shown) is operated, the input shaft member 11 coupled to the rotor of the motor is rotated. As the input shaft member 11 is rotated, the outer ring 20 coupled to the input shaft member 11 is rotated about the rotational axis Lo. Then, the first and second annular members 30, 40 respectively received in the first and second receiving holes 21, 22 formed in the outer ring 20 revolve around the rotational axis Lo with the rotation of the outer ring 20.

Here, the respective insertion holes 32 of the first annular member 30 performing a revolution motion has the pins 51 on the disc member 50 inserted thereinto and are in engagements with the pins 51 through the rolling bearings 52. Since the disc member 50 is fixed to the housing H, the first annular member 30 is restrained by the pins 51 from rotating about the first eccentric axis La. That is, with the rotation of the outer ring 20, the first annular member 30 revolves around the rotational axis Lo in the state of maintaining its phase arranged relative to the first eccentric axis La. The same is true with the operation of the second annular member 40.

Further, the internal gear 31 of the first annular member 30 differs in the number of teeth from the external gear 71 of the gear shaft 70 meshing therewith and thus, is meshing with the external gear 71 at only a part thereof in the circumferential direction. Then, when the first annular member 30 revolves around the rotational axis Lo as mentioned above, the gear shaft 70 rotates at a rotational speed that depends on the difference in the number of teeth between the internal gear 31 and the external gear 71, in the same direction as the rotational direction of the input shaft member 11. In this way, in the reduction gear 1 in the present embodiment, because the disc member 50 operating together with the rotational components of the first and second annular members 30, 40 is fixed to the housing H, the both members are restrained from rotating. Then, the revolution components of the first and second annular members 30, 40 are reduced in speed based on the difference in the number of teeth between the internal gears 31, 41 and the external gear 71, whereby a driving force is outputted from the output shaft member 12 coupled to the gear shaft 70.

As described above, the reduction gear 1 in the present embodiment reduces the speed of the rotation inputted from the input shaft member 11 through the gear mechanism 10 and outputs the rotation from the output shaft member 12. The numbers of teeth on the respective gears and the reduction ratio in the reduction gear 1 have the following relation. Here, the number of teeth on the internal gears 31, 41 of the first and second annular members 30, 40 is regarded as Z1, and the number of teeth on the external gear teeth 71 of the gear shaft 70 is regarded as Z2. In this case, the reduction ratio R1 of the reduction gear 1 is calculated by [Mathematical Expression 1]. Here, for example, where the number Z1 of teeth on the internal gears 31, 41 is set to 101 and the number Z2 of teeth on the external gear 71 is set to 100, the reduction ratio R1 of the reduction gear 1 becomes 1/100, so that it is possible to obtain a large reduction ratio through a single stage.

$$R1=(Z1-Z2)/Z2 \quad \text{[Mathematical Expression 1]}$$

R1: Reduction Ratio
Z1: Number of Teeth on Internal Gears 31, 41
Z2: Number of Teeth on External Gear 71
(Effects of the Reduction Gear 1)

According to the reduction gear 1 to which the speed change gear device of the present invention is applied, the revolution components of the first and second annular members 30, 40 that revolve with the rotations restricted are reduced to the rotational speed that depends on the difference (Z1-Z2) in the number of teeth between the internal gears 31, 41 and the external gear 71, and thus, it is possible to obtain a large reduction ratio through a single stage. Further, unlike the construction that an input shaft member has an eccentric portion thereon as is the case of the prior art, the reduction gear 1 supports from outside the first and second annular members 30, 40 which are supported eccentrically relative to the rotational axis Lo. Thus, since the outer ring 20 can arrange the region supporting the first and second annular members 30, 40, outside the reduction gear 1, it is possible to sufficiently secure the strength of the region on which a comparatively large load is exerted at the time of the transmission of a driving force. Accordingly, it is possible to reduce the load per unit area that is exerted on the bearings interposed between the first and second receiving holes 21, 22 and the first and second annular members 30, 40.

Further, in the reduction gear 1, the insertion holes 32, 42 of the first and second annular members 30, 40 and the pins 51 of the disc member 50 constitute the transmission mechanism that makes the rotational components of the first and second annular members 30, 40 and the disc member 50 operate together. When the first annular member 30 revolves around the rotational axis Lo, the transmission mechanism permits the revolution component of the first annular member 30 but restricts the rotation of the first annular member 30. Thus, the reduction gear 1 transmits the rotational components only of the first and second annular members 30, 40 to the disc member 50 through the transmission mechanism and hence, can operate the gear mechanism 10 further reliably.

Further, because of being provided with the plurality of annular members 30, 40, the reduction gear 1 can disperse the load when the driving force is transmitted, between the first and second annular members 30, 40 having the internal gears 31, 41 and the gear shaft 70 having the external gear 71 meshing with the internal gears 31, 41. Accordingly, the reduction gear 1 can enhance the maximum driving force that is mechanically transmittable.

Further, the plurality of first and second receiving holes 21, 22 in the outer ring 20 are of the construction that the respective eccentric axes La, Lb are defined to become an equiangular interval in the rotational direction about the rotational axis Lo. With the construction like this, the first and second annular members 30, 40 supported in the outer ring 20 are arranged at the equiangular interval in the circumferential direction of the rotation about the rotational axis Lo. That is, two of the first and second annular members 30, 40 are arranged at 180-degree interval. Thus, with the rotation of the outer ring 20, it is possible to mutually offset the rotational imbalances which are brought about by the revolution motions of the first and second annular members 30, 40 arranged eccentrically from the rotational axis Lo. Accordingly, the reduction gear 1 is able to suppress the vibration of the device as a whole and to operate the gear mechanism 10 further stably.

The reduction gear 1 is constructed to be provided with the pin supporting member 81 supporting the pins 51 of the disc member 50. Here, in the reduction gear 1, the transmission mechanism composed of the insertion holes 32, 42 and the pins 51 synchronizes the rotational components of the first and second annular members 30, 40 with the disc member 50 to restrict the rotations of the first and second annular members 30, 40. Thus, it may occur that in the driving state of the reduction gear 1, a strong load is exerted on the plurality of pins 51 in the circumferential direction of the rotational axis Lo. With this taken into consideration, in the construction provided with the pin supporting member 81 as described above, the plurality of pins 51 on the disc member 50 are supported by the disc member 50 and the pin supporting member 81 at the both end portions thereof in a both support fashion and keep the intervals with one another. As a result, it becomes possible to stabilize the driving state by preventing the loads exerted on the plurality of pins 51 from leaning to a certain pin 51.

Further, the reduction gear 1 is constructed so that the outer ring 20 is arranged outside the gear mechanism 10 that performs the speed reduction, and thus, is also applicable to a construction wherein the driving force is inputted from the outside of the device. For example, where the driving source is a motor having an outer rotor, it is possible to directly fix the outer rotor to the outer ring 20 without interposing the input shaft member 11 therebetween. Thus, the device can be simplified in construction as a whole by the decrease in the number of components and can realize the downsizing. Like this, the reduction gear 1 to which the speed change gear device of the present invention is applied can adapt to various forms of outputs from driving sources and can enlarge the range in use of the device.

Modified Form of the First Embodiment

Figure 4:
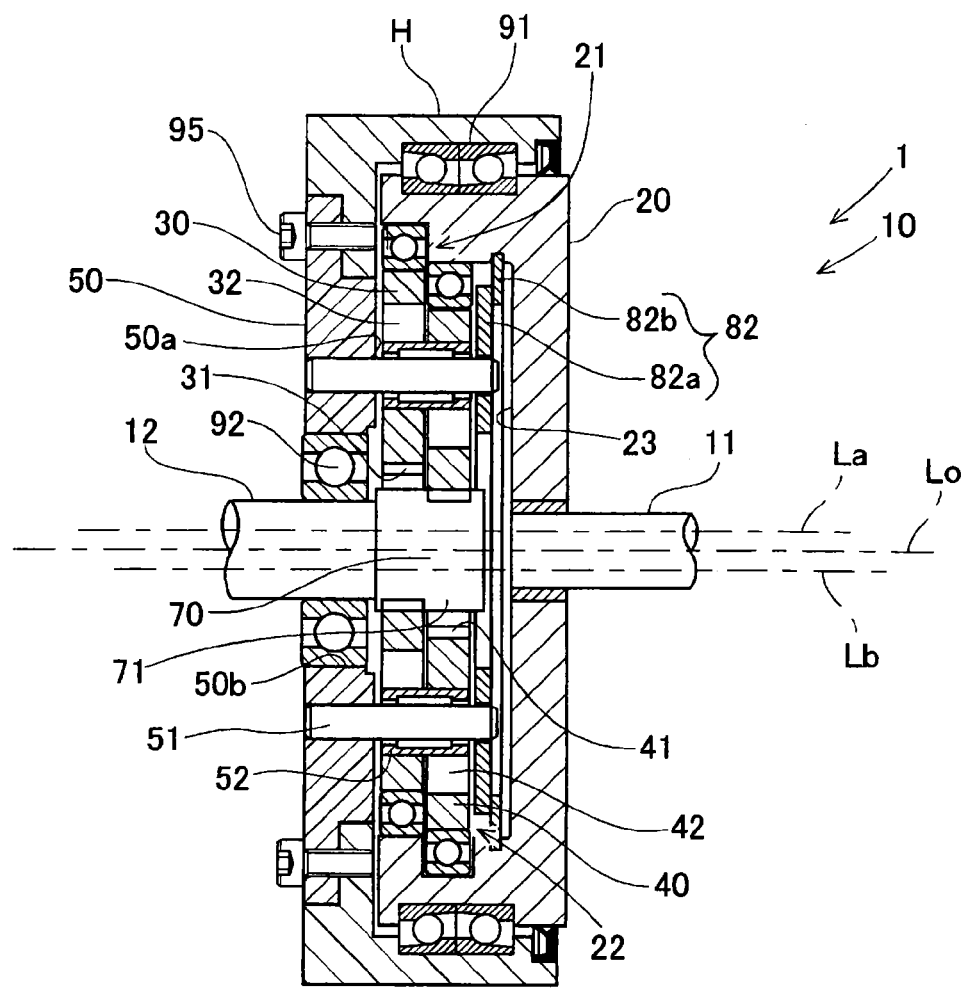
FIG. 4 is a sectional view showing the basic construction of a reduction gear 1 in a modified form of the first embodiment.

A modified form of the first embodiment will be described with reference to FIG. 4. In the first embodiment, the reduction gear 1 is provided with the pin supporting member 81. On the contrary, as shown in FIG. 4, the reduction gear 1 may be constructed to be provided with a pin retaining member 82. The pin retaining member 82 has a plate 82a and a retaining ring 82b. The pin retaining member 82 is located in a direction in which the pins 51 of the disc member 50 protrude from the first and second annular members 30, 40.

The plate 82a is an annular member being smaller in diameter than the inside diameter of the outer ring 20. The plate 82a is formed with a cylindrical internal surface centered on the rotational axis Lo so as not to contact the gear shaft 70 that rotates about the rotational axis Lo. Then, the plate 82a is formed with pin holes of the same number as the plurality of pins 51 and is coupled by clearance fitting to end portions of the pins 51 passing through the insertion holes 32, 42 of the first and second annular members 30, 40. Thus, the plate 82a retains the six pins 51 secured to the disc member 50 to hold the intervals therebetween. Since the disc member 50 is fixed on the housing H, the plate 82a is a member that does not rotate even in the driving state of the reduction gear 1. The retaining ring 82b is an annular member that positions the plate 82a at a predetermined position in the axial direction of the rotational axis Lo. The retaining ring 82b is secured in a retaining ring groove formed on the internal surface of the outer ring 20 and rotates about the rotational axis Lo with the rotation of the outer ring 20 in the driving state of the reduction gear 1. With the construction like this, the retaining ring 82b is in sliding contact with the plate 82a and positions the plate 82a retaining the pins 51, at a predetermined position in the axial direction of the rotational axis Lo.

According to the construction like this, the plurality of pins 51 on the disc member 50 have the mutual intervals held by the plate 82a in the driving state of the reduction gear 1. This performs the same effect as the pin supporting member 81 in the present embodiment does. Also, although in the present embodiment, the reduction gear 1 is constructed to be provided with the pin supporting member 81 or the pin retaining member 82, there may be taken a construction that is not provided with either of the both members where the rotational speed, the magnitude of the driving force to be transmitted or the like in the driving state of the reduction gear 1 are taken into consideration. With the construction like this, it is possible to shorten the width of the reduction gear 1 in the axial direction of the rotational axis Lo and to downsize the device as a whole.

Second Embodiment

Figure 5:
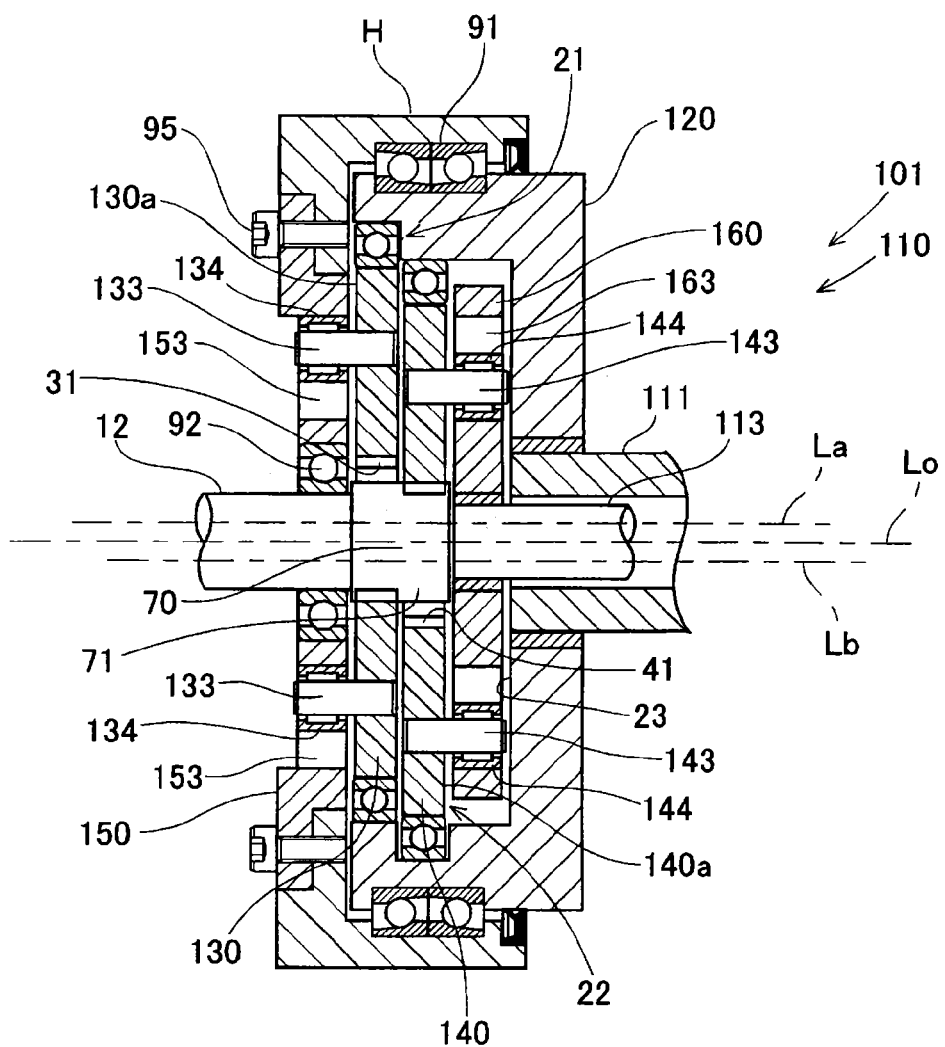
FIG. 5 is a sectional view showing the construction of a reduction gear 101 in a second embodiment.
Figure 6:
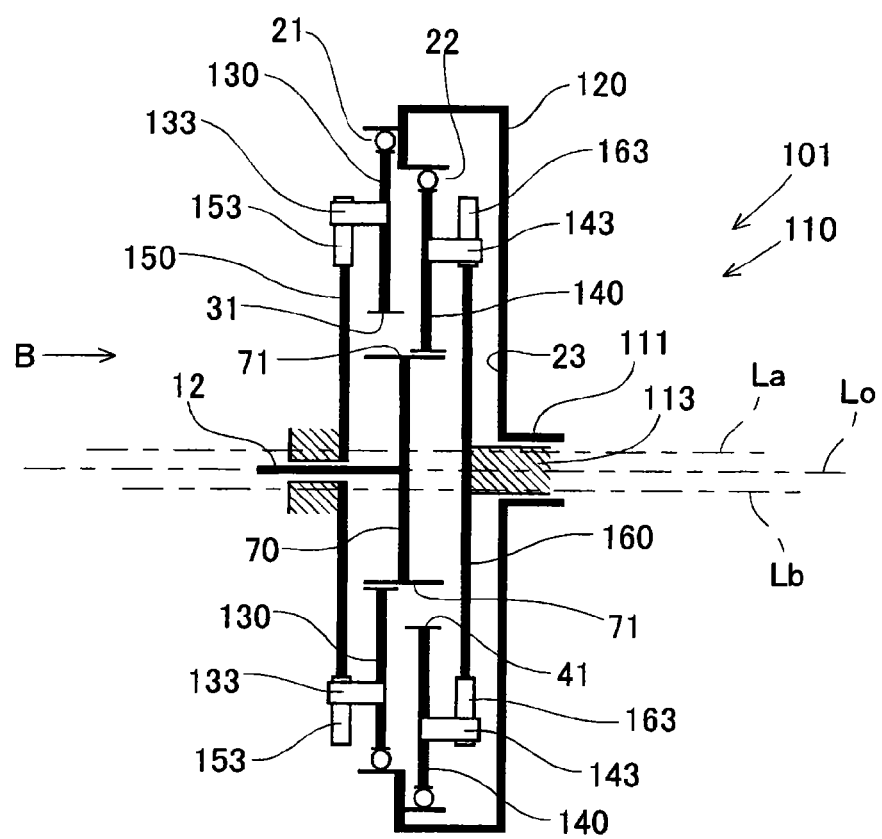
FIG. 6 is a conceptual diagram showing the basic construction of the reduction gear 101.
Figure 7:
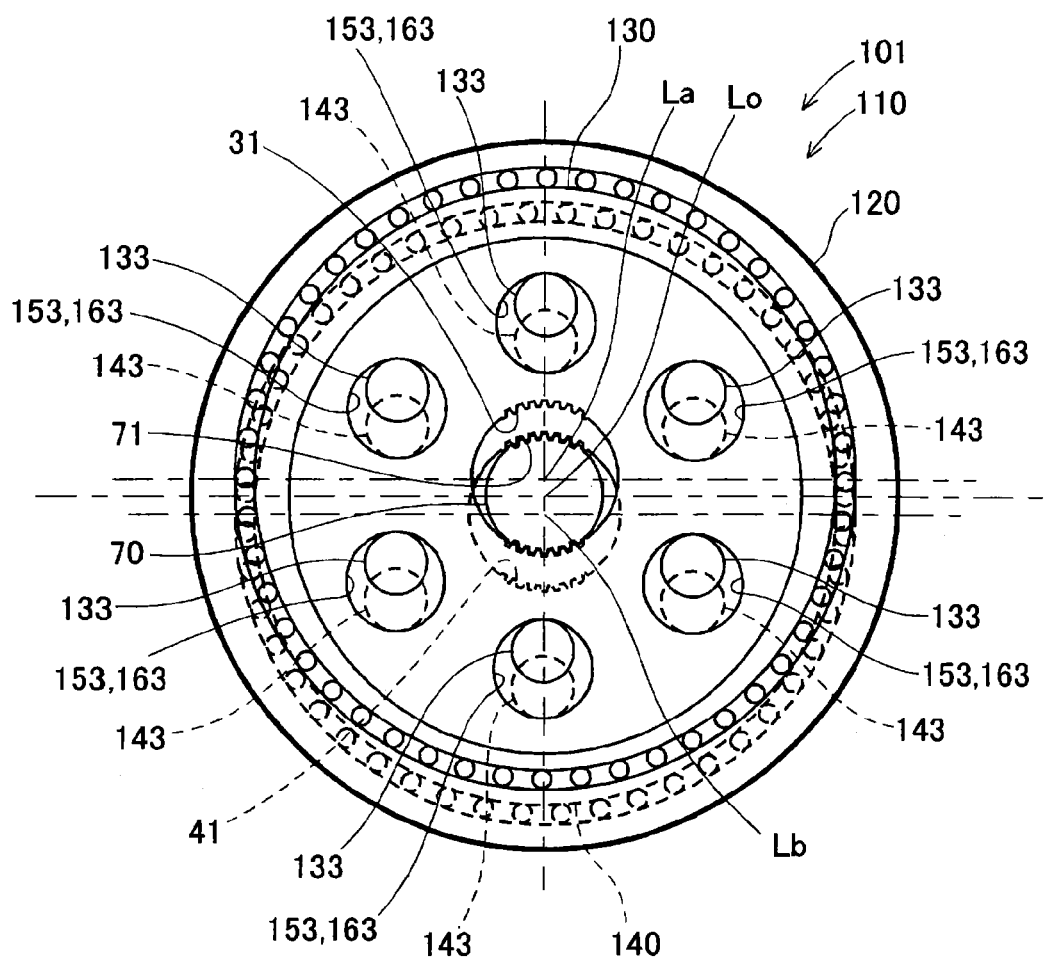

The construction of a second embodiment will be described with reference to FIGS. 5-7. In order to illustrate a meshing state of the internal gears 31, 41 with the external gear 71, FIG. 7 shows parts only of the respective gears. Here, the construction in the second embodiment differs mainly in the construction of the transmission mechanism which restricts the rotations of the first and second annular members 30, 40 in the reduction gear 1 of the first embodiment. Other constructions are substantially the same as those in the first embodiment, and thus, the detailed description thereof will be omitted. Hereinafter, description will be made regarding the differences only.

(Construction of the Reduction Gear 101)

A reduction gear 101 is mainly composed of the housing H, a gear mechanism 110, an input shaft member 111, the output shaft member 12 and a stationary shaft member 113. The gear mechanism 110 is composed of an outer ring 120 (corresponding to "first member" in the present invention), a first annular member 130, a second annular member 140, a first disc member 150 (corresponding to "second member" in the present invention), a second disc member 160 (corresponding to "second member" in the present invention), the gear shaft 70 and the bearings 91, 92. As shown in FIG. 5, the housing H is a case receiving the gear mechanism 110 that directly or indirectly and rotatably supports the input shaft member 111 and the output shaft member 12 coaxially arranged on the predetermined rotational axis Lo and that performs the change in speed.

The input shaft member 111 is an input shaft that inputs a driving force to the gear mechanism 110. The input shaft member 111 is formed to a cylindrical shape and receives the stationary shaft member 113 on the internal surface side. The stationary shaft member 113 is fixed to the housing H through, e.g., a stator of a motor to be put in a state that it does not rotate relative to the housing H. The outer ring 120 press-fits the input shaft member 111 to a cylindrical internal surface formed on the center portion thereof to be coupled to the input shaft member 111. The outer ring 120 differs from the outer ring 20 in the first embodiment in that the input shaft connected thereto differs and that the bottom portion 23 is not formed with the recessed portion 23a. Other constructions are substantially the same as those in the first embodiment, and thus, the detailed description of the other constructions will be omitted.

The first annular member 130 is a planetary gear that is formed annularly and that is arranged inside the outer ring 120 with the gear shaft 70 passing therethrough. Further, the receiving hole 21 receives the first annular member 130 at a position where the center of the first annular member 130 is at a predetermined distance from the rotational axis Lo. Then, the first annular member 130 has columnar pins 133 that protrudes from an end surface 130a on the side (left side in FIG. 5) facing the first disc member 150, toward the first disc member 150 in the axial direction of the rotational axis Lo, and rolling bearings 134. In the present embodiment, as shown in FIG. 7, six pins 133 are secured on the end surface 130a to be at equiangular intervals in the circumferential direction of the first annular member 130. Further, the first annular member 130 has the cylindrical rolling bearings 134 rotatably fitted on the outer sides of the columnar pins 133.

The detailed description of the second annular member 140 will be omitted as the same is a planetary gear which is the same in shape as the aforementioned first annular member 130. Further, the pins 143 on the second annular member 140 and rolling bearings 144 correspond to the pins 133 on the first annular member 130 and the rolling bearings 134, respectively. However, the pins 143 protrude from an end surface 140a on the side (right side in FIG. 5) where the second annular member 140 faces the second disc member 160, toward the second disc member 160 in the axial direction of the rotational axis Lo. Then, the receiving hole 22 receives the second annular member 140 at a position where the center of the second annular member 140 is at the predetermined distance from the rotational axis Lo.

The first disc member 150 is formed with insertion holes 153 that are formed to pass across the opposite end surfaces in the axial direction of the rotational axis Lo. The insertion holes 153 are pin holes into which the pins 133 on the first annular member 130 are inserted. As shown in FIG. 5, the second disc member 160 is juxtaposed with the first annular member 130 and the second annular member 140 in the axial direction of the rotational axis Lo. Further, the second disc member 160 is coupled with the stationary shaft member 113 secured to the housing H and is formed with insertion holes 163 that are formed to pass across the opposite end surfaces in the axial direction of the rotational axis Lo. The insertion holes 163 are pin holes into which the pins 143 on the second annular member 140 are inserted.

Since the respective pins 133, 143 are respectively engaged with the respective insertion holes 153, 163, the first and second disc members 150, 160 constructed like this are coupled to the first and second annular members 130, 140 through the respective pins 133, 143. Further, in the present embodiment, since the first disc member 150 is fixed to the housing H and the second disc member 160 is fixed to the stationary shaft member 113, the first and second annular members 130, 140 are restrained from rotating. Like this, the pins 133, 143 and the insertion holes 153, 163 constitute a transmission mechanism that transmits the rotational components only of the first and second annular members 130, 140 performing revolution motions, to the disc members.

The reduction gear 101 in the present embodiment differs from the reduction gear 1 in the first embodiment in the respect of the construction of the transmission mechanism that restricts the rotations of the first and second annular members 30, 40 (130, 140). Therefore, the detailed description regarding the operation of the reduction gear 101 in the present embodiment will be omitted since the operation is similar to the operation of the reduction gear 1 in the first embodiment and since the reduction ratio R1 become the same as that in the first embodiment.

(Effects of the Reduction Gear 101)

According to the reduction gear 101 to which the speed change gear device of the present invention is applied, the pins 133, 143 on the first and second annular members 130, 140 and the insertion holes 153, 163 of the first and second disc members 150, 160 constitute the transmission mechanism that operates the rotational components of the first and second annular members 130, 140 together with the first and second disc members 150, 160. Thus, the same effects as those of the reduction gear 1 in the first embodiment are performed. Further, the length of the pins 133 on the first annular member 130 suffices to be the distance to the insertion holes 153 on the first disc member 150 to which the pins 133 are coupled. Therefore, it is possible to shorten the length of the pins 130 comparatively. The same is true with the pins 143 on the second annular member 140. Accordingly, it is possible to decrease the moment exerted on the pins 133, 143 in the driving state of the reduction gear 101.

Third Embodiment

The constitution of a third embodiment will be described with reference to FIGS. 8 and 9. Here, the construction of the third embodiment mainly differs in that in the present embodiment, a second member (disc member 250) is made as an output member though the shaft member (gear shaft 70) of the reduction gear 1 in the first embodiment is made as the output member. Further, a reduction gear 201 in the present embodiment corresponds to the speed change gear device according to the second invention in that the shaft member (gear shaft 270) is arranged not to be rotatable relative to the housing H and that only the rotational components of the annular members (first and second annular members 30, 40) which revolve while rotating are outputted from the second member (disc member 250). Detailed description of other constructions will be omitted as such other constructions are substantially the same as those in the first and second embodiments. Hereinafter, description will be made regarding the differences only.

(Construction of the Reduction Gear 201)

The reduction gear 201 is composed mainly of the housing H, a gear mechanism 210, the input shaft member 111, the output shaft member 12, and the stationary shaft member 113. The gear mechanism 210 is composed of the outer ring 120, the first annular member 30, the second annular member 40, the disc member 250 (corresponding to "second member" in the present invention), the gear shaft 270, the pin supporting member 281, and the bearings 91, 93. As shown in FIG. 8, the housing H directly or indirectly and rotatably supports the input shaft member 111 and the output shaft member 12 arranged coaxially on the predetermined rotational axis Lo.

Figure 8:
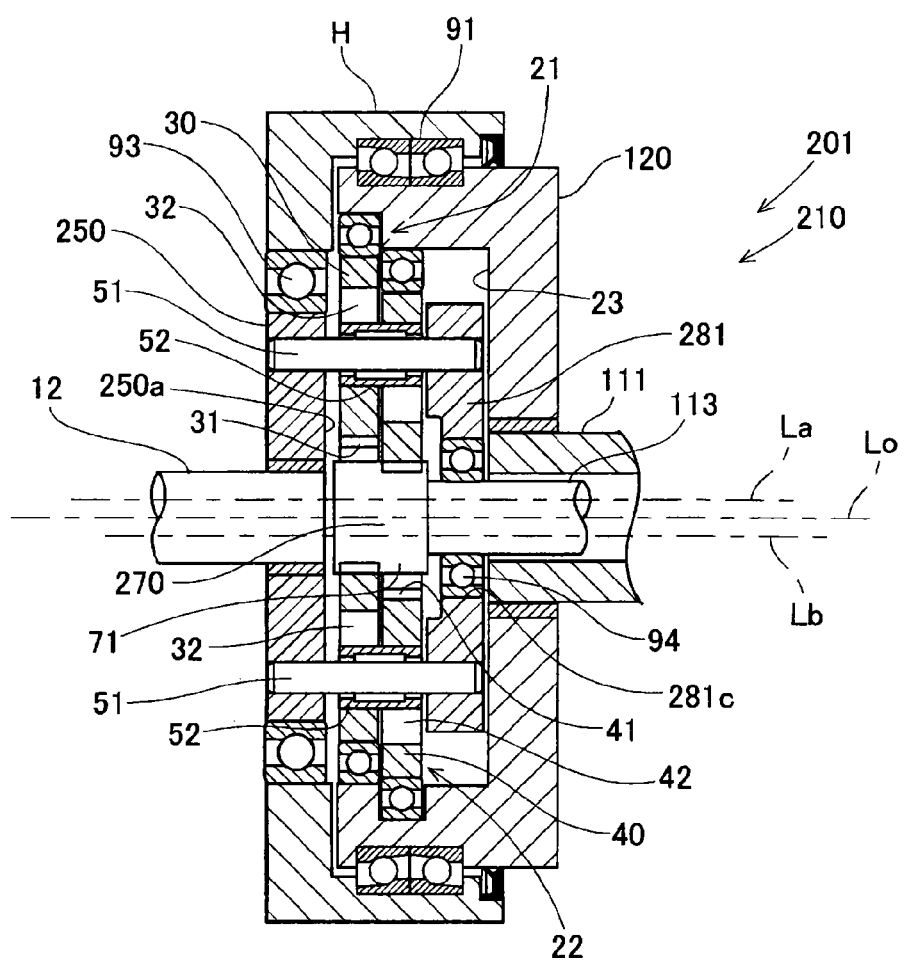
FIG. 8 is a sectional view showing the construction of a reduction gear 201 in a third embodiment.

As shown in FIG. 8, the disc member 250 is juxtaposed with the first annular member 30 and the second annular member 40 in the axial direction of the rotational axis Lo. Further, the disc member 250 is rotatably supported in the housing H through the bearing 93. The disc member 250 is an output member which is coupled to the output shaft member 12 press-fitted in a cylindrical internal surface formed at the center portion thereof and which outputs a driving force. Further, the disc member 250 has the pins 51 that protrude from an end surface 250a on one side (right side in FIG. 8) toward the first and second annular members 30, 40 in the axial direction of the rotational axis Lo, and the rolling bearings 52.

When the first and second annular members 30, 40 perform revolution motions with the rotation of the outer ring 120, the driving force is transmitted from the internal surfaces of the respective insertion holes 32, 42 of the first and second annular members 30, 40 to the disc member 250 of the construction like this through the pins 51 and the rolling bearings 52. At this time, on the basis of the dimensional relation of the outer diameter of the rolling bearings 52 to the respective insertion holes 32, 42, the rotational components only in the revolution motions of the first and second annular members 30, 40 are transmitted to the disc member 250. That is, the disc member 250 is coupled to operate together with the rotational components of the first and second annular members 30, 40. Like this, the pins 51 and the insertion holes 32, 42 constitute the transmission mechanism that transmits the rotational components only of the first and second annular members 30, 40 performing the revolution motions, to the disc member 250.

Figure 9:
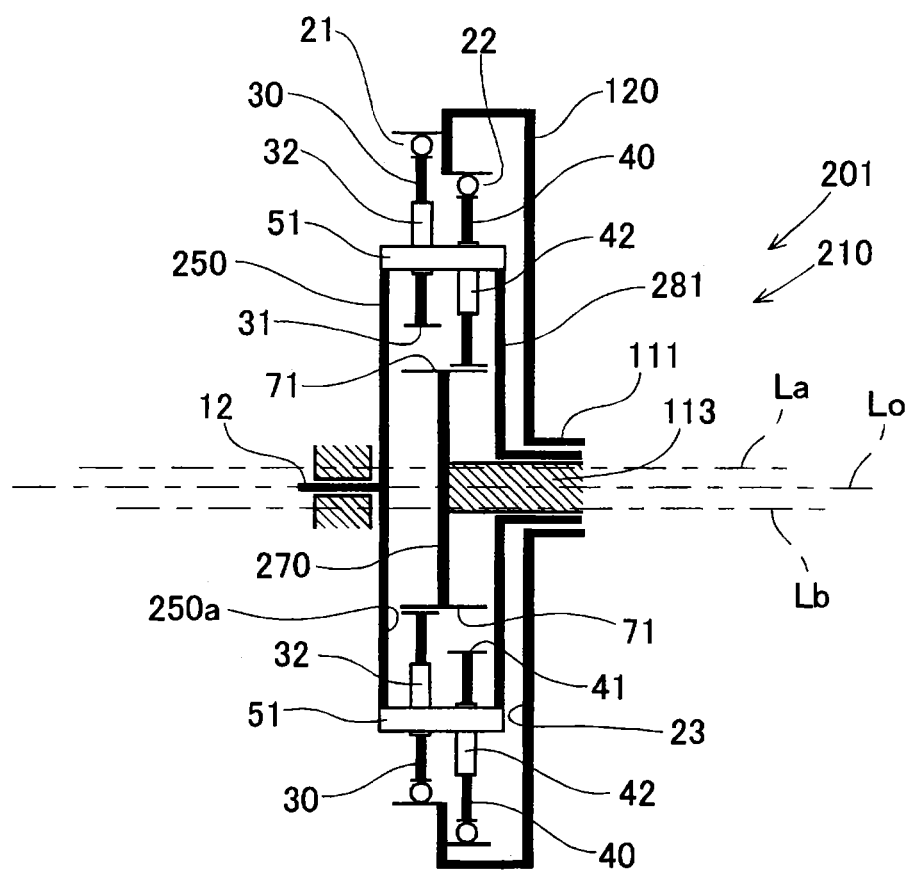
FIG. 9 is a conceptual diagram showing the basic construction of the construction of the reduction gear 201.

The gear shaft 270 is a sun gear formed to a shaft shape and having the external gear 71, as shown in FIGS. 8 and 9, and is arranged on the rotational axis Lo. Further, the gear shaft 270 is coupled to the stationary shaft member 113 whose end on one side (right side in FIGS. 8 and 9) is secured to the housing H. With the construction like this, the gear shaft 270 is fixed to the housing H through the stationary shaft member 113 or the like and is in a state of being non-rotatable relative to the housing H.

The pin supporting member 281 is a disc-like member which is arranged rotatably about the rotational axis Lo. The pin supporting member 281 is formed with a cylindrical internal surface 281c and is supported on the stationary shaft member 113 through a bearing 94 provided inside the internal surface 281. Further, the pin supporting member 281 is formed with pin holes of the same number as the plurality of pins 51 formed on the disc member 250 and is coupled by press-fitting or clearance fitting to end portions of the pins 51 that pass through the insertion holes 32, 42 of the first and second annular members 30, 40.

(Operation of the Reduction Gear 201)

Next, the operation of the reduction gear 201 in the present embodiment will be described. At first, when the motor (not shown) is operated, the input shaft member 111 coupled to the rotor of the motor is rotated. As the input shaft member 111 is rotated, the outer ring 120 coupled to the input shaft member 111 is rotated about the rotational axis Lo. Then, the first and second annular members 30, 40 respectively received in the first and second receiving holes 21, 22 formed in the outer ring 120 revolve around the rotational axis Lo with the rotation of the outer ring 120.

Here, the internal gears 31, 41 of the first and second annular members 30, 40 are meshing with the external gear 71 of the gear shaft 270 at only parts thereof in the circumferential direction. Then, since the gear shaft 270 is fixed to the stationary shaft member 113, the first and second annular members 30, 40, while revolving, respectively rotate about the first and second eccentric axes La, Lb at a rotational speed that depends on the difference in the number of teeth between the internal gears 31, 41 and the external gear 71. The rotational direction at this time becomes an opposite direction to the rotational direction of the input shaft member 111 (counterclockwise if the input shaft member 111 rotates clockwise).

Here, the respective insertion holes 32 of the first annular member 30 performing a revolution motion while rotating has the pins 51 on the disc member 250 inserted thereinto and are in engagements with the pins 51 through the rolling bearings 52. Thus, when the first annular member 30 performs the revolution motion while rotating, the rotational component is transmitted to the pins 51. Thus, the disc member 250 rotates at the rotational speed at which the first annular member 30 rotates. In this way, the disc member 250 extracts the rotational component only from the revolution motion of the first annular member 30 through the pins 51 and the rolling bearings 52 and outputs the rotation inputted from the input shaft member 111, to the output shaft member 12 at a reduced speed. The same is true with the operations of the second annular member 40 and the disc member 250.

As described above, the reduction gear 201 in the present embodiment reduces the speed of the rotation inputted from the input shaft member 111, by the gear mechanism 210 and outputs the rotation from the output shaft member 12. Further, the numbers of teeth on the respective gears and the reduction ratio in the reduction gear 201 like this have the following relation. Here, the number of teeth on the internal gears 31, 41 of the first and second annular members 30, 40 is regarded as Z1, and the number of teeth on the external gear 71 of the gear shaft 270 is regarded as Z2. In this case, the reduction ratio R2 of the reduction gear 1 is calculated by [Mathematical Expression 2]. Here, for example, where the number Z1 of teeth on the internal gears 31, 41 is set to 101 and the number Z2 of teeth on the external gear 71 is set to 100, the reduction ratio R2 of the reduction gear 1 becomes 1/101, so that it is possible to obtain a large reduction ratio through a single stage.

$$R2=(Z1-Z2)/Z1 \qquad \text{[Mathematical Expression 2]}$$

R2: Reduction Ratio
Z1: Number of Teeth on Internal Gears 31, 41
Z2: Number of Teeth on External Gear 71

(Effects of the Reduction Gear 201)

According to the reduction gear 201 to which the speed change gear device of the present invention is applied, the reduction gear 201 outputs the rotational components only of the first and second annular members 30, 40 which revolve while rotating. At this time, the rotational components of the first and second annular members 30, 40 become a rotational speed that is reduced in dependence on the difference (Z1−Z2) in the number of teeth between the internal gears 31, 41 and the external gears 71. Accordingly, the reduction gear 201 is able to obtain a large reduction ratio through a single stage. Further, the same constructions as those of the first and second reduction gears 1, 101 in the first and second embodiments perform the same effects as the reduction gears 1, 101 do.

For example, it may be the case that a driven device which is coupled to the reduction gear 201 to be given the driving force transmitted thereto is located on the outer circumferential side of the reduction gear 201 or that an input member of the driven device is larger in diameter than the disc member 250. In this case, because the disc member 250 formed to the disc-like shape is used as an output member in the reduction gear 201, there may be taken a construction that the disc member 250 and the input member of the driven device is directly coupled without interposing the output shaft member 12 therebetween. With this construction, although in the reduction gear in the prior art, the driving force is outputted from the output member at the center thereof, it is possible to transmit the driving force from the disc member 250 being the output member of the reduction gear 201 directly to the driven device. Like this, the reduction gear 201 is able to obtain a high speed change ratio and is applicable to the aforementioned driven device located on the outer circumferential side of the reduction gear 201.

Modified Form of Third Embodiment

Figure 10:
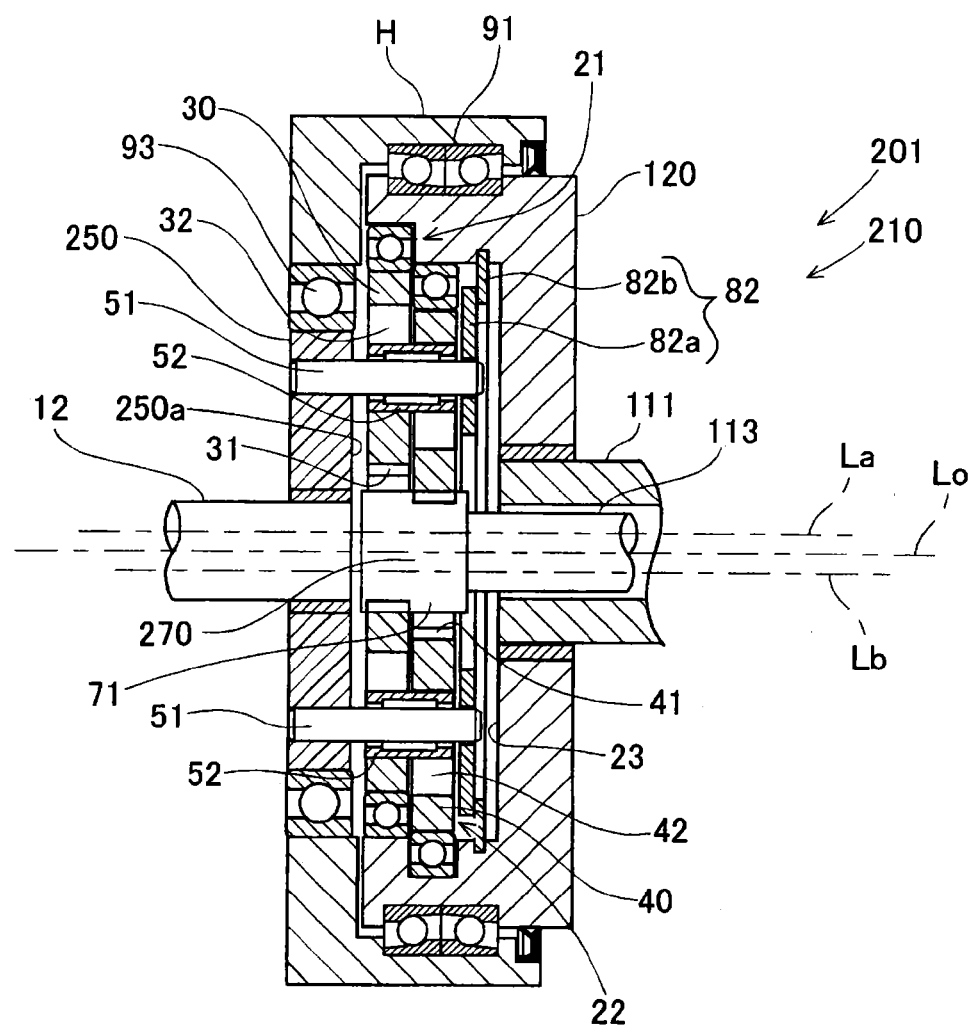
FIG. 10 is a sectional view showing the basic construction of a reduction gear 201 in a modified form of the third embodiment.

A modified form of the third embodiment will be described with reference to FIG. 10. In the third embodiment, the reduction gear 201 is provided with the pin supporting member 281. On the contrary, as shown in FIG. 10, the reduction gear 201 may be constructed to be provided with the pin retaining member 82. The detail description of the pin retaining member 82 will be omitted because of being substantially the same as that described in the modified form of the first embodiment. However, in the present embodiment, since the disc member 250 operates together with the rotational components of the first and second annular members 30, 40, the plate 82a rotates in the operation together with the rotation of the disc member 250 in the driving state of the reduction gear 201. With the construction like this, the same effects can be achieved as the pin retaining member 82 in the modified form of the first embodiment does.

Fourth Embodiment

Figure 11:
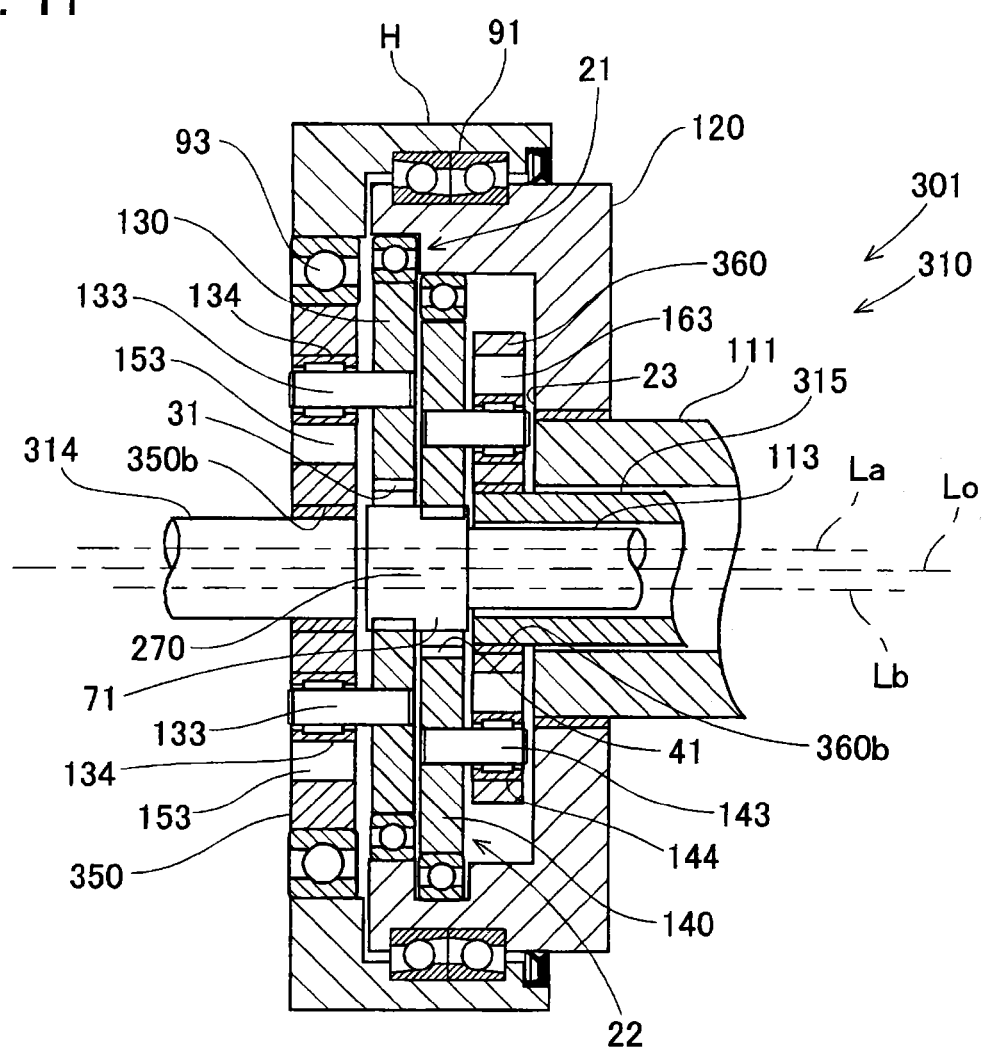
FIG. 11 is a sectional view showing the construction of a reduction gear 301 in a fourth embodiment.
Figure 12:
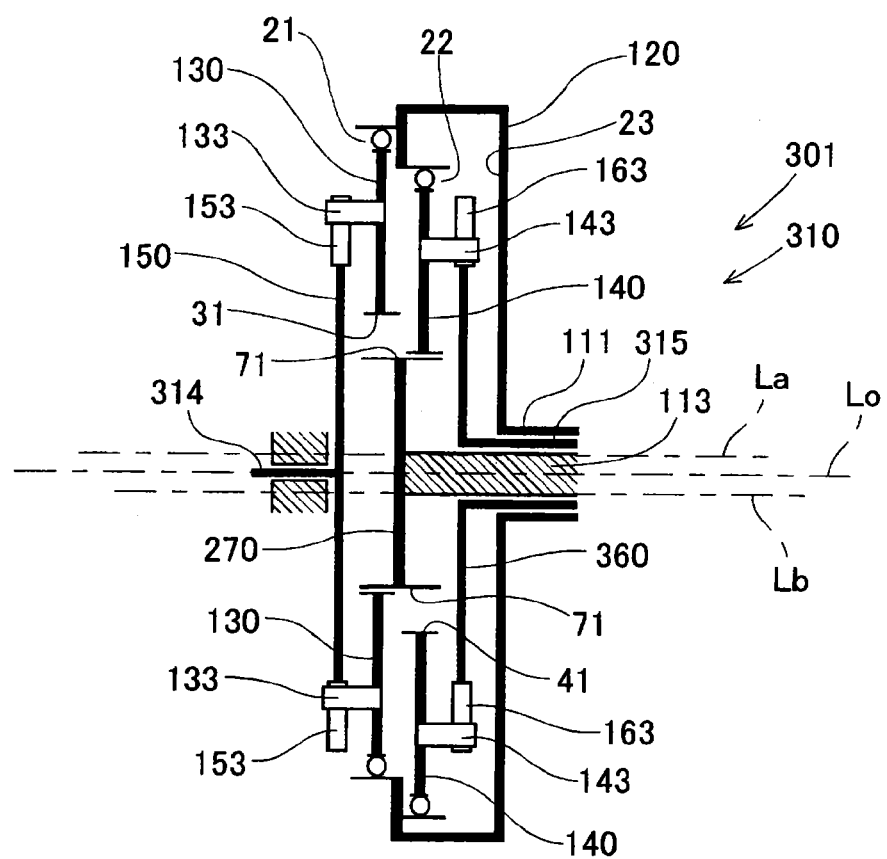
FIG. 12 is a conceptual diagram showing the basic construction of the reduction gear 301.

The construction of a fourth embodiment will be described with reference to FIGS. 11 and 12. Here, the construction of the fourth embodiment mainly differs in the construction of the transmission mechanism that transmits the rotational components of the first and second annular members 30, 40 in the reduction gear 201 of the third embodiment. The detailed description of other constructions will be omitted as being substantially the same as those in the first to third embodiments. Hereinafter, description will be made as to the differences only.

(Construction of the Reduction Gear 301)

A reduction gear 301 is mainly composed of the housing H, a gear mechanism 310, the input shaft member 111, the stationary shaft member 113, a first output shaft member 314 and a second output shaft member 315. The gear mechanism 310 is composed of the outer ring 120 (corresponding to "first member" in the present embodiment), the first annular member 130, the second annular member 140, a first disc member 350 (corresponding to "second member" in the present embodiment), a second disc member 360 (corresponding to "second member" in the present embodiment), the gear shaft 270, and the bearings 91, 93. As shown in FIG. 11, the housing H is a case that directly or indirectly and rotatably supports the input shaft member 111, the first output shaft member 314 and the second output shaft member 315 arranged coaxially on the rotational axis Lo and that receives the gear mechanism 310 for performing the change in speed.

The first and second output shaft members 314, 315 are output shafts that output the rotations reduced in speed by the gear mechanism 310. The first output shaft member 314 is arranged on the other side (left side in FIGS. 11 and 12) of the reduction gear 301 and is coupled to an internal surface 350b of the first disc member 350. The second output shaft member 315 is arranged on one side (right side in FIGS. 11 and 12) of the reduction gear 30, is received on an internal side of the cylindrical input shaft member 111, and is supported rotatably by a bearing (not shown) to be rotatable relative to the input shaft member 111. Then, the second output shaft member 315 is coupled to an internal surface 360b of the second disc member 360 and receives the stationary shaft member 113 secured to the housing H on the internal surface side formed to a cylindrical shape.

The first disc member 350 is an output member that is coupled by press-fitting to the first output shaft member 314 at a cylindrical internal surface formed at the center portion thereof and that outputs a driving force. As shown in FIG. 11, the second disc member 360 is juxtaposed with the first annular member 130 and the second annular member 140 in the axial direction of the rotational axis Lo. Further, the second disc member 360 is an output member that is coupled to the second output shaft member 315 and that outputs a driving force. The first and second disc members 350, 360 respectively correspond to the first and second disc members 150, 160 of the reduction gear 101 in the second embodiment.

Regarding the first disc member 350 of the construction like this, when the first annular member 130 revolves with the rotation of the outer ring 120, the driving force is transmitted to the first disc member 350 through the respective pins 133 and the rolling bearings 134 of the first annular member 130. At this time, on the basis of the dimensional relation of the outer diameter of the rolling bearing 134 to each insertion hole 153, the rotational component only of the revolution motion of the first annular member 130 is transmitted to the first disc member 350. Likewise, with the rotation of the outer ring 20, the rotational component only of the revolution motion of the second annular member 140 is transmitted to the second disc member 360. In this way, the pins 133, 143 and the insertion holes 153, 163 constitute transmission mechanisms that transmit the rotational components only of the first and second annular members 130, 140 performing revolution motions, to the first disc member 350 and the second disc member 360.

The reduction gear 301 in the present embodiment differs from the reduction gear 201 in the third embodiment in the constructions that transmit the rotational components of the first and second annular members 30, 40 (130, 140). Thus, the detailed description will be omitted regarding the operation of the reduction gear 301 in the present embodiment because such operation is the same as the operation of the reduction gear 201 in the third embodiment and because the both embodiments become equal in the reduction ratio R2. However, the reduction gear 301 takes as output members both members of the first and second disc members 350, 360. For this reason, there is a difference that the rotation inputted from the input shaft member 111 is reduced in speed by the gear mechanism 310 and is outputted in two directions including the first output shaft member 314 coupled to the first disc member 350 and the second output shaft member 315 coupled to the second disc member 360.

(Effects of the Reduction Gear 301)

According to the reduction gear 301 to which the speed change gear device of the present invention is applied, the reduction gear 301 performs the same effects as the reduction gears 1, 101, 201 in the first to third embodiments do. Further, the reduction gear 301 takes as output members the plurality of first and second disc members 350, 360 and outputs the reduced rotations in the differential directions in the axial direction. Like this, where the outer ring 120 is taken as the input member and the gear shaft 270 is taken as the stationary member, it is possible to take the plurality of the first and second disc members 350, 360 as respective output members and to output a plurality of rotations from the reduction gear 301. Accordingly, the reduction gear 301 to which the speed change gear device of the present invention is applied is able to obtain a high speed change ratio and is applicable to the output form of the driving source in which the reduced rotations are required to be outputted in different directions.

<Other>

Hereinabove, the speed change gear device of the present invention has been described as the reduction gears 1-301. Besides, it is possible to apply the speed change gear device of the present invention to a speed increasing gear by changing the input-output relation between the input shaft members 11, 111 and the output shaft member 12, 314, 315 in opposite directions. Further, the reduction gears 1-301 have been constructed to be provided with the first annular members 30, 130 and the second annular members 40, 140. On the contrary, the speed change gear device may be constructed to be provided with a single annular member or three or more annular members. For example, where three annular members are provided, the outer ring 20, 120 is configured to rotatably support respective annular members in three receiving holes. Then, the three receiving holes may be formed so that, for example, the three annular members are arranged at equiangular intervals in the circumferential direction about the rotational axis Lo. With the arrangement so made, the respective annular members result in being arranged at 120-degree intervals. Thus, as is done in the reduction gears 1-301, it is possible to mutually offset the rotational imbalances brought about by the revolution motions of the annular members which are arranged eccentrically from the rotational axis Lo. As a result, it is possible to suppress the vibration of the speed change gear device as a whole and to operate the device further stably.

DESCRIPTION OF SYMBOLS 1, 101, 201, 301: reduction gear (speed change gear device)
10, 110, 210, 310: gear mechanism
11, 111: input shaft member, 12: output shaft member, 113: stationary shaft member
314: first output shaft member, 315: second output shaft member
20, 120: outer ring (first member), 21: first receiving hole
22: second receiving hole, 23: bottom portion, 23a: recessed portion
30, 130: first annular member, 130a: end surface, 31: internal gear
32: insertion hole, 133: pin, 134: rolling bearing
40, 140: second annular member, 140a: end surface, 41: internal gear
42: insertion hole, 143: pin, 144: rolling bearing
50, 250: disc member (second member), 50a, 250a: end surface
50b: internal surface, 51: pin, 52: rolling bearing
150, 350: first disc member (second member), 350b: internal surface
153: insertion hole
160, 360: second disc member (second member), 360b: internal surface
163: insertion hole
70, 270: gear shaft (shaft member), 71: external gear, 72: protrusion
81, 281: pin support member, 81a: protrusion, 81b: recessed portion
281: internal surface
82: pin retaining member, 82a: plate, 82b: retaining ring
91-94: bearings, 95: bolt
Lo: rotational axis, La: first eccentric axis, Lb: second eccentric axis
H: housing, R1, R2: reduction ratio

The invention claimed is:

1. A speed change gear device comprising:
a housing;
a cylindrical first member supported in the housing rotatably about a predetermined rotational axis;
a shaft member arranged inside the first member rotatably about the rotational axis and formed with an external gear on a peripheral surface of the shaft member;
an annular member arranged inside the first member with the shaft member passing through the annular member, the annular member formed with an internal gear at an internal surface of the annular member, the internal gear meshing with the external gear;

a second member arranged such that the second member is not rotatable relative to the housing; and a transmission mechanism that transmits a load from the annular member to the second member;

wherein:

the external gear differs from the internal gear in number of teeth;

the first member is formed with a receiving hole receiving the annular member at a position where an axis of the annular member is at a predetermined distance from the rotational axis; and the annular member is received in the receiving hole such that the annular member is rotatable relative to the first member.

2. The speed change gear device in claim 1, wherein:

the second member is juxtaposed with the annular member in an axial direction of the rotational axis; and the transmission mechanism comprises:

a pin formed on one of the annular member and the second member; and an insertion hole formed on the other of the annular member and the second member, and wherein the pin is inserted into the insertion hole;

wherein the shape of the insertion hole is the same as a circumscribed circle of a locus of the pin when the annular member revolves around the rotational axis.

3. The speed change gear device in claim 1, wherein:

the annular member is one of a plurality of annular members, and the plurality of annular members are each arranged with a respective axis; and the receiving hole is one of a plurality of receiving holes, and the first member is formed with the plurality of receiving holes so that the plurality of annular members are arranged such that the axes of the plurality of annular members are different from each other.

4. The speed change gear device in claim 3, wherein the plurality of receiving holes are formed so that the axes of the plurality of annular members are at equiangular intervals in a rotational direction about the rotational axis.

5. A speed change gear device comprising:

a housing;

a cylindrical first member supported in the housing rotatably about a predetermined rotational axis;

a shaft member arranged on the rotational axis such that the shaft member is not rotatable relative to the housing, and the shaft member being formed with an external gear on a peripheral surface of the shaft member;

an annular member arranged inside the first member with the shaft member passing through the annular member, the annular member formed with an internal gear at an internal surface of the annular member, the internal gear meshing with the external gear;

a second member arranged in the housing rotatably about the rotational axis; and a transmission mechanism that transmits a rotational component of the annular member to the second member;

wherein:

the external gear differs from the internal gear in number of teeth;

the first member is formed with a receiving hole receiving the annular member at a position where an axis of the annular member is at a predetermined distance from the rotational axis; and the annular member is received in the receiving hole such that the annular member is rotatable relative to the first member.

6. The speed change gear device in claim 5, wherein:

the second member is juxtaposed with the annular member in an axial direction of the rotational axis; and the transmission mechanism comprises:

a pin formed on one of the annular member and the second member; and an insertion hole formed on the other of the annular member and the second member, and wherein the pin is inserted into the insertion hole;

wherein the shape of the insertion hole is the same as a circumscribed circle of a locus of the pin when the annular member revolves around the rotational axis.

7. The speed change gear device in claim 5, wherein:

the annular member is one of a plurality of annular members, and the plurality of annular members are each arranged with a respective axis; and the receiving hole is one of a plurality of receiving holes, and the first member is formed with the plurality of receiving holes so that the plurality of annular members are arranged such that the axes of the plurality of annular members are different from each other.

8. The speed change gear device in claim 7, wherein the plurality of receiving holes are formed so that the axes of the plurality of annular members are at equiangular intervals in a rotational direction about the rotational axis.

* * * * *